(12) United States Patent
Durr et al.

(10) Patent No.: US 10,140,286 B2
(45) Date of Patent: Nov. 27, 2018

(54) OPTIMIZED GRAPH TRAVERSAL

(71) Applicant: Google LLC, Mountain View, CA (US)

(72) Inventors: Christopher Jacob Durr, Chicago, IL (US); Hector Mauricio Ayala, Sudbury, MA (US); Mayank Jain, New Delhi (IN)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 15/439,456

(22) Filed: Feb. 22, 2017

(65) Prior Publication Data
US 2018/0239751 A1    Aug. 23, 2018

(51) Int. Cl.
G06F 17/27 (2006.01)
G06F 17/30 (2006.01)
G06N 99/00 (2010.01)
G06F 3/0484 (2013.01)

(52) U.S. Cl.
CPC ...... *G06F 17/278* (2013.01); *G06F 17/30864* (2013.01); *G06F 17/30958* (2013.01); *G06F 17/30961* (2013.01); *G06N 99/005* (2013.01); *G06F 3/04842* (2013.01); *G06F 17/2785* (2013.01)

(58) Field of Classification Search
CPC .......... G06F 17/2785; G06F 17/30654; G06F 17/3097; G06F 17/271; G06F 17/2795; G06F 17/28; G06F 17/30386; G06F 17/30392; G06F 17/30401; G06F 17/3064; G06F 17/30651; G06F 17/30699; G06F 17/30734; G06F 17/30843; G06F 17/30864; G06F 3/048; G06N 5/00; G06N 5/022

USPC .................................. 704/9, 257, 2, 4, 5, 10
See application file for complete search history.

(56) References Cited

U.S. PATENT DOCUMENTS

| | | | |
|---|---|---|---|
| 8,407,253 B2 | 3/2013 | Ryu et al. | |
| 8,909,653 B1 | 12/2014 | Su | |
| 9,224,103 B1 * | 12/2015 | Subramanya | G06N 99/005 |
| 9,390,174 B2 | 7/2016 | Zhou et al. | |

(Continued)

FOREIGN PATENT DOCUMENTS

WO    WO 2016/070028    5/2016

OTHER PUBLICATIONS

International Search Report and Written Opinion issued in International Application No. PCT/US2017032788, dated Jan. 24, 2018, 15 pages.

*Primary Examiner* — Vijay B Chawan
(74) *Attorney, Agent, or Firm* — Fish & Richardson P.C.

(57) ABSTRACT

Methods, systems, and apparatus, including computer programs encoded on a computer storage medium, for optimized graph traversal are disclosed. In one aspect, a method includes the actions of receiving a given phrase that is input through a user interface by a digital component provider. The actions further include determining an entity that is being referred to by the given phrase. The actions further include identifying properties of the entity. The actions further include selecting a subset of the properties that were identified for the entity. The actions further include identifying additional phrases. The actions further include updating the user interface to present at least some of the additional phrases with programmatic controls that assign one or more of the additional phrase as distribution criteria for digital components of the digital component provider in response to activation of the programmatic controls.

18 Claims, 4 Drawing Sheets

(56) References Cited

U.S. PATENT DOCUMENTS

| | | | |
|---|---|---|---|
| 9,465,833 B2* | 10/2016 | Aravamudan | G06F 17/30386 |
| 9,542,447 B1 | 1/2017 | Brennan et al. | |
| 9,542,648 B2 | 1/2017 | Roberts | |
| 9,547,823 B2 | 1/2017 | Hu et al. | |
| 9,582,608 B2* | 2/2017 | Bellegarda | G06F 17/2785 |
| 2005/0080613 A1* | 4/2005 | Colledge | G06F 17/2785 |
| | | | 704/9 |
| 2014/0201629 A1* | 7/2014 | Heck | G06N 5/00 |
| | | | 715/708 |
| 2014/0236570 A1* | 8/2014 | Heck | G06F 17/2785 |
| | | | 704/9 |
| 2014/0236575 A1* | 8/2014 | Tur | G06F 17/2785 |
| | | | 704/9 |
| 2014/0379323 A1* | 12/2014 | Anastasakos | G06F 17/30654 |
| | | | 704/9 |
| 2015/0178273 A1* | 6/2015 | Hakkani-Tur | G06F 17/28 |
| | | | 704/9 |
| 2015/0269176 A1* | 9/2015 | Marantz | G06F 17/3097 |
| | | | 707/767 |
| 2015/0339382 A1* | 11/2015 | Skolicki | G06F 17/30843 |
| | | | 707/722 |
| 2016/0063106 A1 | 3/2016 | Chai et al. | |
| 2016/0132648 A1 | 5/2016 | Shah et al. | |

* cited by examiner

OPTIMIZED GRAPH TRAVERSAL

FIELD

This application relates to data access and data processing.

BACKGROUND

A database is a collection of organized data. A user may access a database to identify information related to a given piece of data. For example, a user may access a database to identify different types of fruits or brands of automobiles.

SUMMARY

To identify additional phrases (e.g., one or more words) that are semantically related to a given phrase, a user (e.g., digital component provider) may submit the given phrase to a system that is configured to traverse a knowledge graph. The knowledge graph provides structured and detailed information about various entities (e.g., specific people, places, things, or topics). The knowledge graph uniquely identifies each different entity using a node and a unique entity identifier that is assigned to the node. The knowledge graph links nodes using relationship links that specify the specific relationship between the nodes. For example, assume that movie titled "Movie A" is directed by "Director 1." In this example, the node in the knowledge graph assigned to "Movie A," would be linked to the node assigned to "Director 1," and the link (or multiple links) between these nodes would have one or more labels that specify that "Movie A" has a relationship of "directed by" to "Director 1," and that "Director 1" has the relationship of "directed" with "Movie A." The collection of nodes and links in the knowledge graph enables the identification of related concepts, which may not otherwise be apparent, by traversing the links and/or nodes of the knowledge graph.

The knowledge graph is vast and traversing more than one level away from a topic is computationally expensive. To reduce the load on the system in traversing the knowledge graph, the system may identify relationships that the given phrase has with other phrases and select for evaluation only those relationships to the given phrase that are likely to lead to phrases that are more closely related or have higher phrase action scores (e.g., interaction rates, or post-interaction activity rates). By selecting for evaluation only those relationships to the given phrase that are likely to reveal phrases that have high phrase action scores, the system reduces the number of knowledge graph paths for the system to traverse, and thus identifies phrases that are related to and/or have high phrase action scores faster and with fewer computing resources than traversing all relationships that are specified by links between the given phrase and other phrases. As such, the traversal of the knowledge graph is optimized (e.g., improved) so that the knowledge graph can be used in a real-time interactive environment to provide real-time information in response to user input, thereby improving the usability/functionality of the knowledge graph.

According to an innovative aspect of the subject matter described in this application, a method for persisting state of a streaming application includes the actions of receiving a given phrase that is input through a user interface by a digital component provider; determining an entity that is being referred to by the given phrase by accessing a knowledge graph comprising nodes that each uniquely identify different entities, and identifying a particular node that uniquely identifies the entity being referred to by the given phrase, where the nodes of the knowledge graph are connected by edges that represent relationships between connected nodes; identifying properties of the entity by accessing other nodes that are connected the particular node the entity; selecting a subset of the properties that were identified for the entity identifying additional phrases by accessing the knowledge graph using the subset of properties that were identified for the entity; and updating the user interface to present at least some of the additional phrases with programmatic controls that assign one or more of the additional phrase as distribution criteria for digital components of the digital component provider in response to activation of the programmatic controls.

These and other implementations can each optionally include one or more of the following features. The actions further include reducing a number of accesses to the knowledge graph by the knowledge graph traverser when identifying the additional phrases. The actions further include identifying, from among the additional phrases, one or more phrases that have a higher performance characteristic than other phrases among the additional phrases by accessing phrase action scores for the identified additional phrases, comparing the phrase action scores to each other, identifying one or more of the phrase action scores having highest values based on the comparison, and selecting the one or more additional phrases having the phrase action scores having the highest values. The actions further include selecting the subset of the properties associated with the entity using a selection model continuously trained using machine learning. The actions further include initially training the selection model using selection model training data including phrases associated with previous search queries submitted by users, digital component selection data associated with the previous search queries, entities associated with the phrases, and properties associated with the entities. Additional identified phrases comprise a minimum spanning tree among the entity.

Other embodiments of this implementation include corresponding systems, apparatus, and computer programs recorded on computer storage devices, each configured to perform the operations of the methods.

The subject matter described in this specification may have one or more of the following advantages. A user can identify phrases that are relevant to a given phrase by accessing the knowledge graph. The system may limit the traversing of the knowledge graph to reduce computer processing requirements.

The details of one or more embodiments of the subject matter described in this specification are set forth in the accompanying drawings and the description below. Other features, aspects, and advantages of the subject matter will become apparent from the description, the drawings, and the claims.

DETAILED DESCRIPTION

Figure 1:
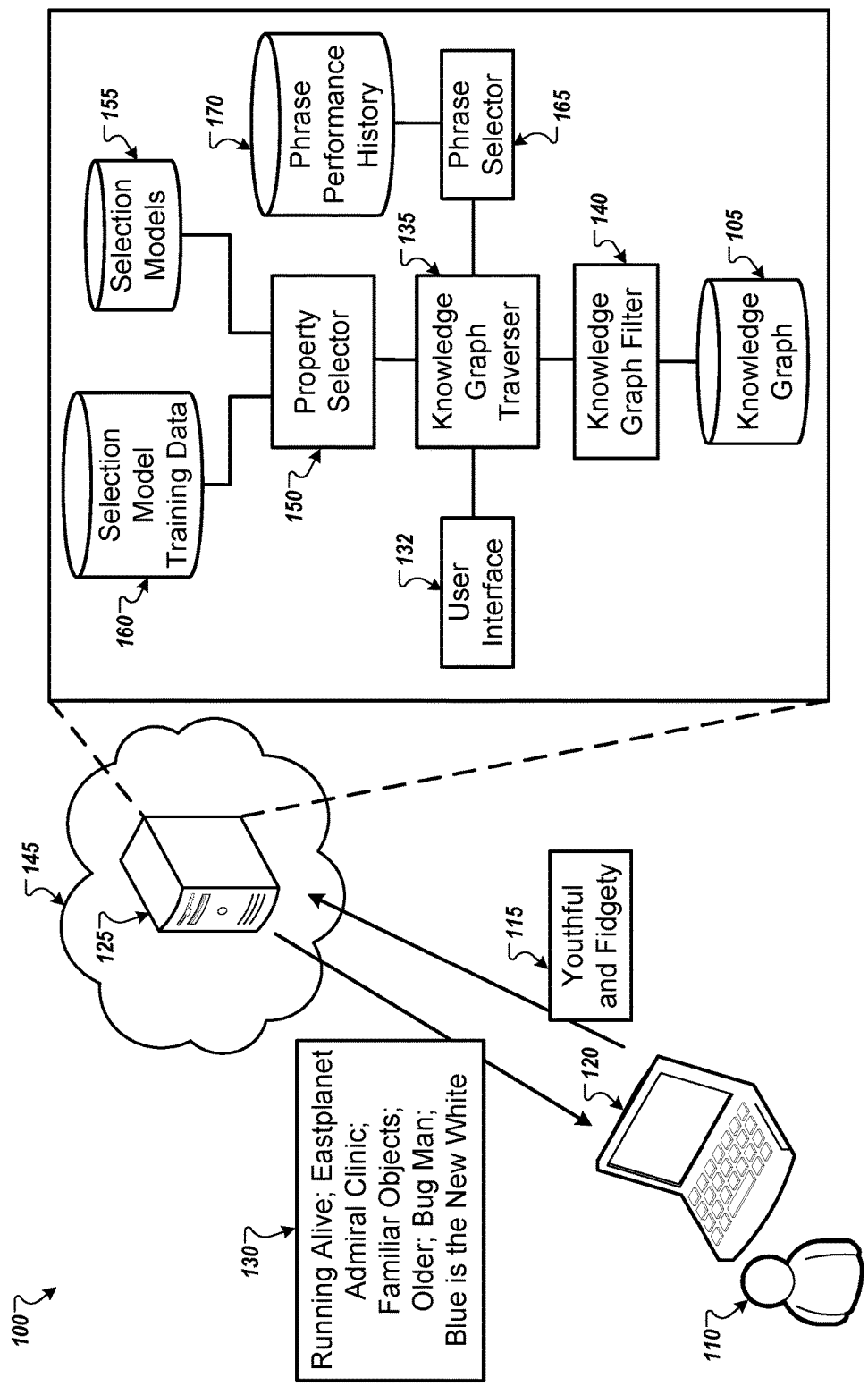
FIG. 1 illustrates an example system for phrase identifying using a knowledge graph.

FIG. 1 illustrates an example system 100 for phrase evaluation using a knowledge graph 105. Briefly, and as described in more detail below, the user 110 (e.g., a digital component provider) submits a given phrase 115 through computing device 120. The computing device 120 transmits the given phrase 115 to the server 125. The server 125 accesses the knowledge graph 105 using the given phrase 115 and traverses nodes/links of the knowledge graph that are connected to the given phrase. The traversal of the nodes/links of the knowledge graph reveals expansion phrases 130 (e.g., other phrases that are related to the given phrase by being connected to the given phrase by a particular relationship link and/or having a phrase action score that meets a pre-specified threshold). The server 125 then provides a list of the expansion phrases 130 to the computing device 120. The user 110 can interact with one or more of the expansion phrases, groups of expansion phrases, or selection controls corresponding to expansion phrases to assign expansion phrases as distribution criteria for one or more digital components (e.g., video files, audio files, images, text, or other content including content in the form of advertisements).

In more detail and following the example illustrated in FIG. 1, assume that the user 110 enters the phrase 115 "youthful and fidgety" into a phrase expansion tool (e.g., a script and hardware components that operate to identify expansion phrases) running on the server 125. The phrase expansion tool generates a user interface through the user interface generator 132. The user interface generator 132 provides a user interface that is displayed on the computing device 120 and receives input from the user 110. The phrase expansion tool is configured to identify expansion phrases that are related to the given phrase 115 through links in the knowledge graph, and/or that have at least a specified phrase action score. Phrases that have at least a specified phrase action score are those phrases that have resulted in at least a minimum level of end user interaction with digital components that were distributed using the phrases. In some implementations, the minimum level of end user interaction can be specified using a threshold phrase action score.

The server 125 receives the given phrase 115 through the user interface 132 and provides the given phrase 115 to the knowledge graph traverser 135. The knowledge graph traverser 135 is configured to access and/or traverse the knowledge graph 105. The knowledge graph 105 and other components of server 125 may be located on the server 125 or may be distributed across multiple servers that include server 125. The multiple servers and server 125 may be accessible through network 145. In other words, the multiple servers and server 125 may be located in the cloud. During the initial access of the knowledge graph 105, the knowledge graph filter 140 may not yet be configured for the given phrase 115. Instead, the knowledge graph traverser 135 may access the knowledge graph directly.

Figure 2:
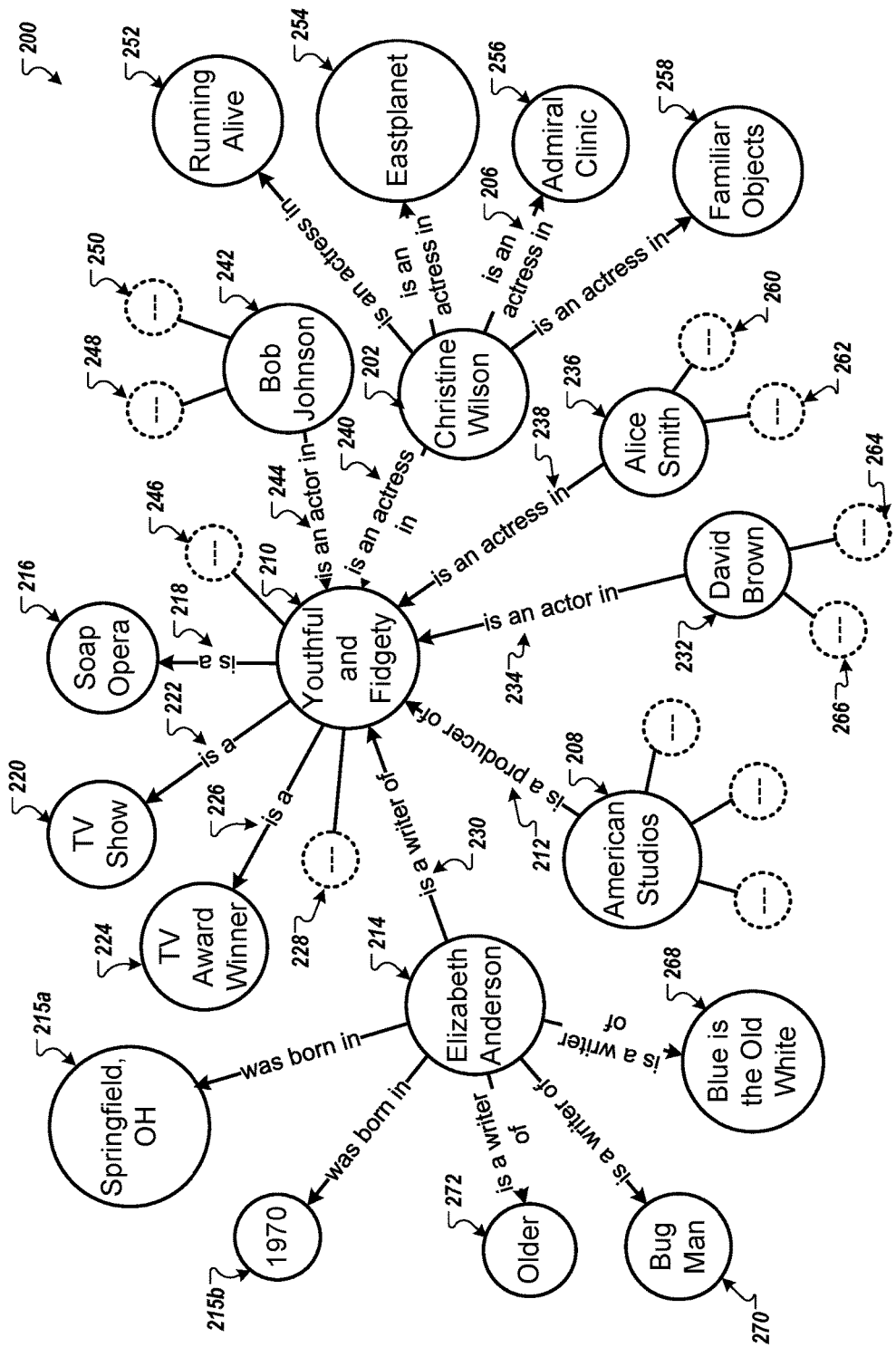
FIG. 2 illustrates example an example knowledge graph.

Briefly turning to FIG. 2, which illustrates an example of the knowledge graph 200. The knowledge graph 200 may be similar to the knowledge graph 105 in FIG. 1. In general, the knowledge graph 200 is a collection of data (e.g., nodes) representing entities and relationships (e.g., labeled links) between entities (e.g., represented by the nodes). The data is logically described and illustrated as a graph, in which each distinct entity is represented by a respective node and each relationship between a pair of entities is represented by an edge (or link) between the nodes. Each edge specifies a relationship (e.g., in the form of a label) and the existence of the edge represents that the specified relationship exists between the nodes connected by the edge. For example, if node 202 represents the person Christine Wilson, node 204 represents a television show Admiral Clinic, and edge 206 specifies the relationship "is an actress in," then having the edge 206 connect the nodes 202 and 204 in the direction from node 202 to node 204 (e.g., unidirectional) in the graph represents the fact that Christine Wilson is an actress in Admiral Clinic. Other connections for node 202 may exist in the knowledge graph 200 that are not related to being an actress. For example, node 202 may be connected to a node representing Jack Wilson. Node 202 and the node representing Jack Wilson may be connected by an edge with the relationship "is married to." In this example, the edge with the relationship "is married to" may be a bidirectional edge since Jack Wilson is married to Christine Wilson and Christine Wilson is married to Jack Wilson.

The knowledge graph 200 can be represented by any of a variety of physical data structures. For example, a knowledge graph can be represented by triples that each represent two entities in order and a relationship from the first to the second entity; for example, [Christine Wilson, Admiral Clinic, is an actress in], or [Christine Wilson, is an actress in, Admiral Clinic], are alternative ways of representing the same fact. Each entity and each relationship can be and generally will be included in multiple triples. As noted above, each entity in the knowledge graph has a corresponding entity identifier that uniquely identifies the entity relative to other entities, even if the same phrase describes two different entities. For example, assume that two entities are textually identified using the phrase "jaguar." In this example, the entity node in the knowledge graph representing the car having the name Jaguar can have the entity identifier "12345," whereas the entity node representing the animal jaguar can have the entity identifier "54321," thereby differentiating these two entities having the same name. In some implementations, the entity identifier rather than, or in addition to, the entity name can be included in the triplets discussed above (or other data structures representing the knowledge graph).

In some implementations, each entity can be stored as a node once, as a record or an object, for example, and linked through a linked list data structure to all the relationships the entity has and all the other entities to which the entity is related. More specifically, the knowledge graph 200 can be stored as an adjacency list in which the adjacency information includes relationship information. It is generally advantageous to represent each distinct entity and each distinct relationship with a unique identifier.

The entities represented by the knowledge graph 200 need not be tangible things or specific people. The entities can include particular people, places, things, artistic works, concepts, events, or other types of entities. Thus, a knowledge graph can include data defining relationships between people, e.g., co-stars in a movie; data defining relationships between people and things, e.g., a particular singer recorded a particular song; data defining relationships between places and things, e.g., a particular type of wine comes from a particular geographic location; data defining relationships between people and places, e.g., a particular person was born in a particular city; and other kinds of relationships between entities. As another example in knowledge graph 200, node 208 that represents television producer American Studios is connected to node 210 that represents television show Youthful and Fidgety. Node 208 and 210 are connected by edge 212 that corresponds to the relationship "is a producer of." Based on the connection from node 208 to node 210 using edge 212, American Studios is a producer of Youthful and Fidgety.

In some implementations, each node has a type based on the kind of entity the node represents; and the types can each have a schema specifying the kinds of data that can be maintained about entities represented by nodes of the type and how the data should be stored. So, for example, a node of a type for representing a person could have a schema defining fields for information such as birth date, birth place, and so on. Such information can be represented by fields in a type-specific data structure, or by triples that look like node-relationship-node triples, e.g., [person identifier, was born on, date], or in any other convenient predefined way. Alternatively, some or all of the information specified by a type schema can be represented by links to nodes in the knowledge graph; for example, [one person identifier, child of, another person identifier], where the other person identifier is a node in the graph.

As an example in knowledge graph 200, node 214 that represents Elizabeth Anderson may include data indicating that she was born in 1970 in Springfield. Alternatively, node 214 may be connected to a node that represents the year 1970 and a node that represents the location Springfield. Node 214 may be connected to the node that represents the year 1970 through an edge that corresponds to "was born in." Node 214 may also be connected to the node the represents the location Springfield through an edge that also corresponds to "was born in." As such, when the server 125 traverses the knowledge graph from the node 214 using the relationship "was born in," the server 125 arrives at both of the nodes 215a (representing Springfield, Ohio) and 215b (representing 1970). The server 125 can aggregate the information from each of the nodes that link to the node 214 by the relationship "was born in" to generate the fact that Elizabeth Anderson was born in Springfield, Ohio in 1970. As the number of nodes having a same relationship to a particular node (or set of nodes) increases, the computational complexity of traversing the knowledge graph to identify information increases, which can lead to slow responsiveness and limit the ability to use the knowledge graph in real-time interactive environments. Further, as the number (or types) of different relationships that are evaluated increases, this will further complicate the retrieval of information from the knowledge graph. Due to the sheer volume of information included in the knowledge graph and the time constraints for accessing/processing this information to provide a real time interactive online application, the use of computing devices is required to effectively utilize the knowledge graph.

Based on the above description, it is apparent that traversing the knowledge graph 200 is a complex and computational expensive operation as the knowledge graph 200 only represents a small portion of a larger knowledge graph that currently exists. While the node 210 representing the television show Youthful and Fidgety may only have about eleven in the example knowledge graph 200, in reality, node 210 may have hundreds, thousands, or millions of connections. As such, techniques are needed to intelligently identify which portions of the knowledge graph should be traversed and/or evaluated for purposes of identifying information (e.g., expansion phrases) in response to a request for information (e.g., submission of a given phrase). The goal of the knowledge graph filter 140 is to reduce the number of nodes and edges that the knowledge graph traverser 135 has to traverse to identify the expansion phrases 130 that are returned to a user 110 that submits the given phrase 115. Doing so will decrease the time spent, power used, memory used, and processing capability used by the knowledge graph traverser 135 in identifying the expansion phrases 130 that are related to phrase 115. In turn, the knowledge graph filter 140 enables the knowledge graph to select and return expansion phrases in the context of a real-time interactive environment, which enables a user 110 to identify and select various new/different phrases that are used to distribute digital components provided by the user 110.

Returning to the knowledge graph traverser 135 accessing the knowledge graph 105 or 200 directly, the knowledge graph traverser 135 accesses the knowledge graph 105 at node 210 that corresponds to the phrase youthful and fidgety. As illustrated in the knowledge graph 200, node 210 is connected to node 216 through edge 218, node 220 through edge 222, node 224 through edge 226, node 228, node 214 through edge 230, node 208 through edge 212, node 232 through 234, node 236 through edge 238, node 202 through edge 240, node 242 through edge 244, and node 246. Each of these edges represents a potential property of the node 210 that corresponds to the phrase youthful and fidgety.

The knowledge graph traverser 135 provides the nodes and edges connected to the node 210 to the property selector 150. The property selector 150 is configured to identify those connected nodes that correspond to properties and to select a subset of those properties that are most likely to lead to phrases with higher performance characteristics. To do that, the property selector 150 may apply one or more selection models. The property selector may choose the selection model based on the phrase 115 or the user 110 or both. For example, if the user 110 is media company and the phrase 115 youthful and fidgety, the property selector may select the properties of actors and writers. The property selector 150 may select actors and writers by examining the edges that connect to the node 210. For example, the properties for node 210 include "is an actor/actress in" from edges 244, 240, 238, and 234, "is a producer of" from edge 212, and "is a writer of" from edge 214. The property selector 150 may also determine that the node 210 of "youthful and fidgety" is a television award winner, a television show, and a soap opera based on nodes 224, 220, and 216, respectively. The knowledge graph 200 may also additional nodes connected to nodes 224, 220, and 216 that represent other television shows. Each of those television show nodes may have writers, directors, producers, actors/actresses, etc. (e.g., as determined by relationship edges connecting the nodes). The property selector 150 may select the properties of actor/actress and writer because those are likely to lead to the phrases with the highest performance properties. This is because end users entering search queries may be more likely to enter names of actor/actress and writer instead of producers or directors.

To assist the property selector 150 in identifying the property selector 150 may access one or more selection models 155. Before processing phrases, the property selector 150 may access selection model training data 160. The selection model training data 160 may include data related to previous search queries, content item selection data of those previous search queries, entities with the phrases, and properties of the entities and with the phrases. The property selector 150 may use neural networks and machine learning to generate the models 155. The server 125 may receive additional training data as more end users enter search queries. The server 125 may store the training data in the selection model training data 160 and the property selector 150 may update the selection models 155. Each selection model may be generated for a type of phrase and digital component provider. For example, phrases related to related to television shows may have a different model then phrases related to food.

Using the properties of "is an actor/actress in" and "is a writer of," the knowledge graph traverser 135 may then access the knowledge graph to identify additional phrases along those properties of the knowledge graph 105. As illustrated in FIG. 2, the knowledge graph traverser 135 accesses nodes 242, 202, 236, 232, and 214. The knowledge graph filter 140 filters out the nodes 208, 228, 224, 220, 216, and 246. The reduces the computational cost of accessing the knowledge graph 200 by over half because the knowledge graph traverser 135 does not traverse down the nodes 208, 228, 224, 220, 216, and 246. The knowledge graph traverser 135 identifies nodes that have similar relationships to the nodes 242, 202, 236, 232, and 214 that those nodes have to the original phrase node 210. In particular, the knowledge graph traverser 135 identifies nodes 248, 250, 252, 254, 256, 258, 260, 262, 264, 266, 268, 270, and 272. Each of these nodes has either "is an actor/actress in" or "is a writer of" relationship with the nodes connected to the node 210. To keep the size of the knowledge graph 200 from being too large for the page some nodes, such as nodes 248, 250, 246, 228, 260, 262, 264, and 266, are represented in abbreviated form where "---" represents some value and the connecting edge includes a relationship. The actual value has been removed from the representation of knowledge graph 200.

The knowledge graph traverser 135 provides the data from nodes 248, 250, 252, 254, 256, 258, 260, 262, 264, 266, 268, 270, and 272 to the phrase selector 165. The data in these nodes are the relevant phrases identified by the knowledge graph traverser 135. The phrase selector 165 may be configured to return a particular number of phrases that have the highest phrase action scores (which may be pre-calculated by a remote server and/or simply accessed from a data store that stores an index between phrases and their corresponding phrase action scores). For example, of the phrases received from the knowledge graph traverser 135, the phrase selector 165 may return the seven phrases with the highest performance characteristics. The phrase selector 165 may also be configured to return a particular percentage of the phrases with the highest performance characteristics. In some implementations, the phrase selector 165 may be configured to return the phrases with performance characteristics that are higher than the performance characteristics of the phrase 115.

To identify the phrases with the highest performance characteristics, the phrase selector 165 accesses the phrase performance history 170. The phrase performance history 170 may include data related to the phrase action scores for all the phrases of search queries and displayed digital components. In this example, the phrases with the highest performance characteristics are Running Alive, Eastplanet, Admiral Clinic, Familiar Objects, Older, Bug Man, and Blue is the New White. Therefore, the server 125 returns the expansion phrases 130. The user 110 may choose to bid on those phrases so that the user's 110 digital components may be displayed when an end user enters a search query related to one of these phrases.

In some implementations, the knowledge graph filter 140 may access different models in the selection models 155. In the example shown in FIG. 1, the actors and writer who correspond to nodes 242, 202, 236, 232, and 214 may not be equals in the sense that some of the actors and writers may be more popular than others. In this regard, a model may be able to filter out nodes that have the same or similar properties as other nodes in favor of the nodes that is the more popular, in terms of more search queries. For example, the knowledge graph filter 140 may filter out nodes 242, 236, and 232 because those nodes have a common property with more popular node 202. For example, Bob Johnson, Alice Smith, David Brown, and Christine Wilson are all actors or actresses in Youthful and Fidgety. Christine Wilson may be the most popular of the four, so the knowledge graph filter 140 filters out Bob Johnson, Alice Smith, David Brown. The knowledge graph filter 140 may not filter out node 214 because node 214 corresponds to the only writer for node 210 and writer was previously identified as popular. The knowledge graph filter 140 effectively reduce the nodes that connect to node 210 to only node 202 and node 214 therefore reducing the load on the processor and memory required to traverse the knowledge graph 105 to the next level.

In some implementations, the server 125 may use the knowledge graph 105 to identify phrases that may be similar to phrase 115 by only identifying different entities that correspond to the phrase 115. In the example knowledge graph 200, the server may identify that node 210 corresponds to the entities of soap opera at node 216, television show at node 220, and television award winner at node 224. Each of those nodes 216, 220, and 224 may connect to other nodes that are also soap operas, television shows, television award winners, or any combination of the three. Although not illustrated in knowledge graph node 256 corresponds to both a soap opera and television show, so that node 256 includes a connection to nodes 216 and 220. The knowledge graph traverser 135 identifies the nodes that connect to each of the entities of nodes 216, 220, and 224 and identifies those nodes that connect to the entity nodes. The phrase selector 165 then identifies the performance characteristic for each of the phrases of the nodes connected to nodes 216, 220, and 224. The phrase selector 165 may then identify the phrases and/or the entities that correspond to the performance characteristics. For example, the phrase selector 165 may identify that phrases of entities that correspond to the soap opera entity perform better than those of the television show entity or the television award winner entity.

In some implementations, the phrase selector 165 may utilize a minimum spanning tree to identify phrases. The phrase selector 165 identifies those phrases within the related entities that have the highest performance factors. For example, the phrase selector may identify the minimum number of nodes that span the three nodes 216, 220, and 224. There may be a node that connects to all the nodes 216, 220, and 224. The performance factors may be compared to other groups of nodes that connect to 216, 220, and 224 to identify the smallest group of phrases with the highest performance factors per node.

In some implementations, the user 110 may provide multiple phrases to the system 125 and request that the system group the phrases into different groups. The system accesses the knowledge graph to identify different entities that each of the phrases belongs to and groups the phrases accordingly. In some instances, the system 125 may identify too many groups. In this case, the user 110 may request that the system 125 classify the phrases into fewer groups. The system may have to traverse additional levels of the knowledge graph to identify additional groups that may be used to classify the received phrases.

Once the system 125 identifies the expansion phrases 130 requested by the user 110 may allocate additional resources to those expansion phrases 130. Because the expansion phrases 130 area already identified as high ranking, the user 110 may divert more resources towards those phrases in order to present digital components to end users who enter related search queries into a search engine.

Figure 3:
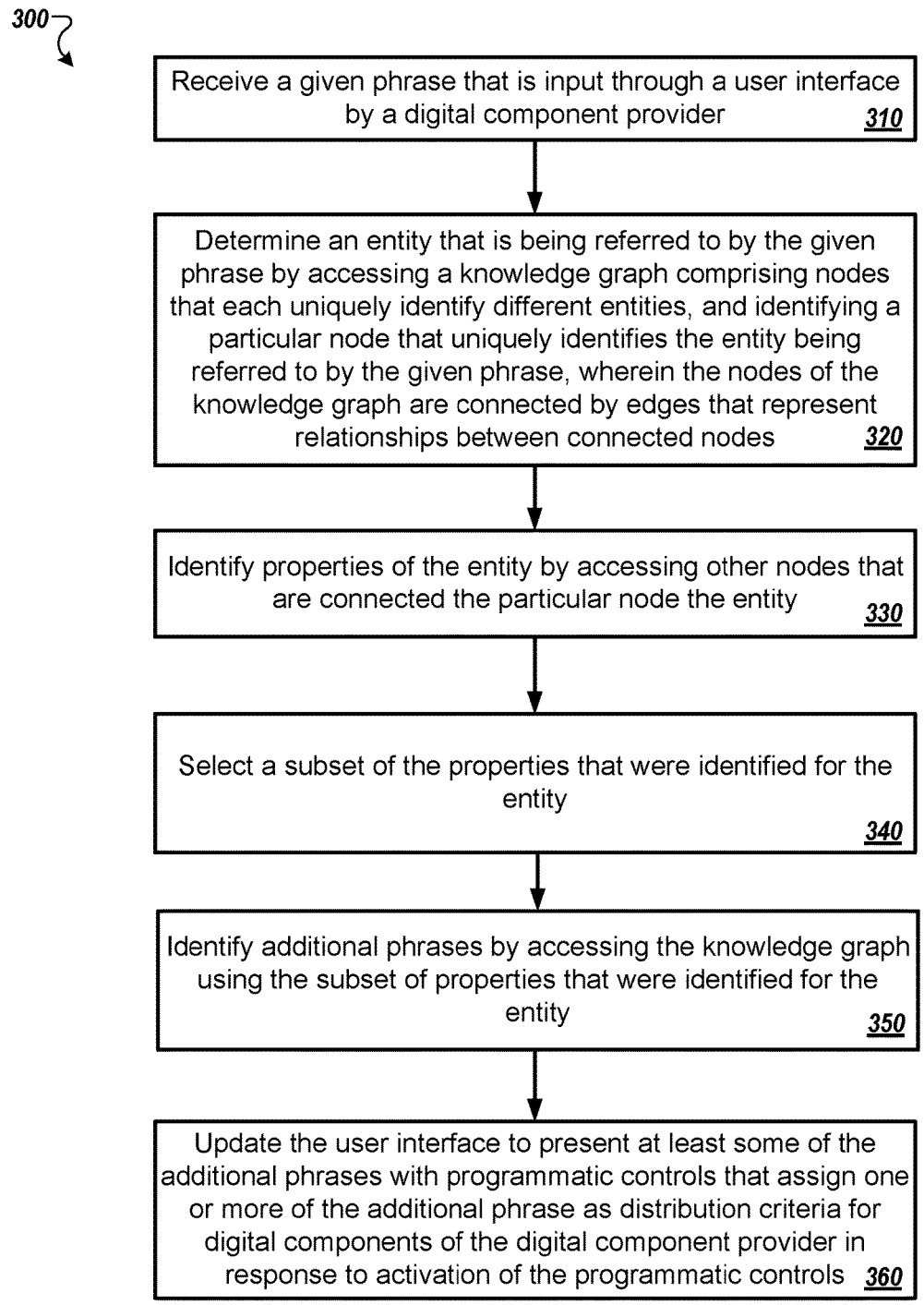
FIG. 3 illustrates an example process for phrase identifying using a knowledge graph.

FIG. 3 illustrates an example process 300 for phrase identifying using a knowledge graph. In general, the process 300 accesses a knowledge graph to identify phrases that are related to a received phrase. The process 300 filters the knowledge graph so that the process 300 does not necessarily have to traverse all paths related to the received phrase. The process selects phrases that are likely to have high performance characteristics, so that other potential expansion phrases (and potentially corresponding relationships) can be ignored (e.g., not evaluated). The process 300 will be described as being performed by a computer system comprising one or more computers, for example, the system 100 as shown in FIG. 1.

The system receives a given phrase that is input through a user interface by a digital component provider (310). In some implementations, the system receives data identifying a user associated with the phrase. For example, the system may receive the phrase "sword fighter" and the user Videogame Company. In this instance, the system may identify phrases that may be particularly relevant to the user Videogame Company.

The system determines an entity that is being referred to by the given phrase by accessing a knowledge graph comprising nodes that each uniquely identify different entities, and identifying a particular node that uniquely identifies the entity being referred to by the given phrase, wherein the nodes of the knowledge graph are connected by edges that represent relationships between connected nodes (320). The entity may be thought of as a type or category that represents the phrase. Following the example from above, the system accesses the node associated with the phrase "sword fighter." The system access the nodes connected to the sword fighter node. Some of the nodes and edges may indicates "published in 2010," "is an action game," "played on game system" and "created by Gamer Game." The system may select the entity for "sword fighter" as "game system" because that entity may lead to other phrase s that are more closely related to "sword fighter" in the context of the user Videogame Company.

The system identifies properties of the entity by accessing other nodes that are connected the particular node the entity (330). In some implementations, the system may access nodes that are two levels from the entity. For example, nodes that are one level away from the entity "game system" may include other video games for the game system such as "Football Bowl," "Guitar Player," and "Gun Shooter." Each of the games may include other relationships such as "is in the genre." The game Football Bowl is in the genre sports games. The game Guitar Player is in the genre music games. The game Gun Shooter is in the genre action games. In this instance the three properties may be sports games, music games, and action games.

The system selects a subset of the properties that were identified for the entity (340). In some implementations, the system reduces the number of phrases by applying a model. The model may be specific to the type of user. In this instance, the user is a video game publisher. Based on previous data video game publishes may be interested in learning about similar games for consoles that they produce games for. The system may identify the genre of action games as it is related to the original phrase of sword fighter. By reduction the number of properties, the system reduces a number of accesses the system makes to the knowledge graph. Reducing the number of accesses improves the search speech and allows other processes running on the system to access larger amounts of processing power and memory because the system uses fewer resources traversing the knowledge graph.

In some implementations, the system trains the models using training data and machine learning. The training data may be related to the properties and entities that are typically important to different types of users. Game console makers may be interested in games for that are produced for their console. Television show producers may be interested in other television shows that have actors and writers that are the same as some of their popular shows and that are on the television network. The training data may be updated as more users select phrases that the system outputs. With the updated training data, the system may use machine learning to update the models.

The system identifies additional phrases by accessing the knowledge graph using the subset of properties that were identified for the entity (350). Continuing with the action game genre example, the system identifies phrases that where the same property of action game. The system may identify "Space Explorer," "Jungle Fighter," and "Water Shooter" as other phrases that belong to the action game genre. The system may also determine that these games are available the video game console "Game System." Because the user is accessing the system to identify phrases for bidding on to display digital components, the console maker may not want to bid on games for other game systems. The system may also select from the identified phrases to identify those phrases that have higher performance characteristics as the other phrases. The system may compare the performance characteristics of the identified phrases to the original phrase and select the phrases with performance characteristics greater than the original phrase. Some examples of performance characteristics include phrase action scores. The system the user interface to present at least some of the additional phrases with programmatic controls that assign one or more of the additional phrase as distribution criteria for digital components of the digital component provider in response to activation of the programmatic controls (360).

Figure 4:
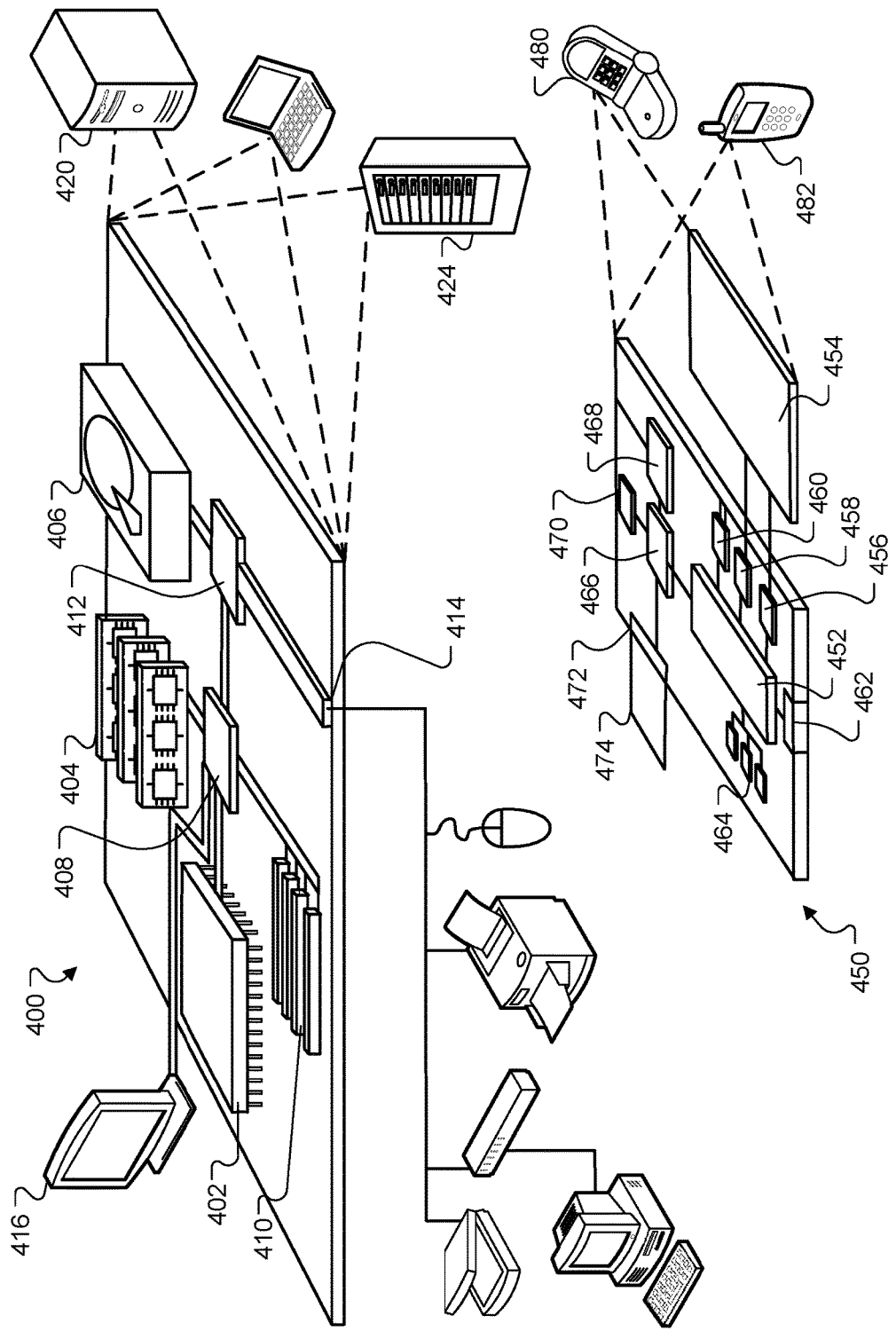
FIG. 4 illustrates an example of a computing device and a mobile computing device.

FIG. 4 shows an example of a computing device 400 and a mobile computing device 450 that can be used to implement the techniques described here. The computing device 400 is intended to represent various forms of digital computers, such as laptops, desktops, workstations, personal digital assistants, servers, blade servers, mainframes, and other appropriate computers. The mobile computing device 450 is intended to represent various forms of mobile devices, such as personal digital assistants, cellular telephones, smart-phones, and other similar computing devices. The components shown here, their connections and relationships, and their functions, are meant to be examples only, and are not meant to be limiting.

The computing device 400 includes a processor 402, a memory 404, a storage device 406, a high-speed interface 408 connecting to the memory 404 and multiple high-speed expansion ports 410, and a low-speed interface 412 connecting to a low-speed expansion port 414 and the storage device 406. Each of the processor 402, the memory 404, the storage device 406, the high-speed interface 408, the high-speed expansion ports 410, and the low-speed interface 412, are interconnected using various busses, and may be mounted on a common motherboard or in other manners as appropriate. The processor 402 can process instructions for execution within the computing device 400, including instructions stored in the memory 404 or on the storage device 406 to display graphical information for a GUI on an external input/output device, such as a display 416 coupled to the high-speed interface 408. In other implementations, multiple processors and/or multiple buses may be used, as appropriate, along with multiple memories and types of memory. Also, multiple computing devices may be connected, with each device providing portions of the necessary operations (e.g., as a server bank, a group of blade servers, or a multi-processor system).

The memory 404 stores information within the computing device 400. In some implementations, the memory 404 is a volatile memory unit or units. In some implementations, the memory 404 is a non-volatile memory unit or units. The memory 404 may also be another form of computer-readable medium, such as a magnetic or optical disk.

The storage device 406 is capable of providing mass storage for the computing device 400. In some implementations, the storage device 406 may be or contain a computer-readable medium, such as a floppy disk device, a hard disk device, an optical disk device, or a tape device, a flash memory or other similar solid state memory device, or an array of devices, including devices in a storage area network or other configurations. Instructions can be stored in an information carrier. The instructions, when executed by one or more processing devices (for example, processor 402), perform one or more methods, such as those described above. The instructions can also be stored by one or more storage devices such as computer- or machine-readable mediums (for example, the memory 404, the storage device 406, or memory on the processor 402).

The high-speed interface 408 manages bandwidth-intensive operations for the computing device 400, while the low-speed interface 412 manages lower bandwidth-intensive operations. Such allocation of functions is an example only. In some implementations, the high-speed interface 408 is coupled to the memory 404, the display 416 (e.g., through a graphics processor or accelerator), and to the high-speed expansion ports 410, which may accept various expansion cards. In the implementation, the low-speed interface 412 is coupled to the storage device 406 and the low-speed expansion port 414. The low-speed expansion port 414, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 400 may be implemented in a number of different forms, as shown in the figure. For example, it may be implemented as a standard server 420, or multiple times in a group of such servers. In addition, it may be implemented in a personal computer such as a laptop computer 422. It may also be implemented as part of a rack server system 424. Alternatively, components from the computing device 400 may be combined with other components in a mobile device, such as a mobile computing device 450. Each of such devices may contain one or more of the computing device 400 and the mobile computing device 450, and an entire system may be made up of multiple computing devices communicating with each other.

The mobile computing device 450 includes a processor 452, a memory 464, an input/output device such as a display 454, a communication interface 466, and a transceiver 468, among other components. The mobile computing device 450 may also be provided with a storage device, such as a micro-drive or other device, to provide additional storage. Each of the processor 452, the memory 464, the display 454, the communication interface 466, and the transceiver 468, are interconnected using various buses, and several of the components may be mounted on a common motherboard or in other manners as appropriate.

The processor 452 can execute instructions within the mobile computing device 450, including instructions stored in the memory 464. The processor 452 may be implemented as a chipset of chips that include separate and multiple analog and digital processors. The processor 452 may provide, for example, for coordination of the other components of the mobile computing device 450, such as control of user interfaces, applications run by the mobile computing device 450, and wireless communication by the mobile computing device 450.

The processor 452 may communicate with a user through a control interface 458 and a display interface 456 coupled to the display 454. The display 454 may be, for example, a TFT (Thin-Film-Transistor Liquid Crystal Display) display or an OLED (Organic Light Emitting Diode) display, or other appropriate display technology. The display interface 456 may comprise appropriate circuitry for driving the display 454 to present graphical and other information to a user. The control interface 458 may receive commands from a user and convert them for submission to the processor 452. In addition, an external interface 462 may provide communication with the processor 452, so as to enable near area communication of the mobile computing device 450 with other devices. The external interface 462 may provide, for example, for wired communication in some implementations, or for wireless communication in other implementations, and multiple interfaces may also be used.

The memory 464 stores information within the mobile computing device 450. The memory 464 can be implemented as one or more of a computer-readable medium or media, a volatile memory unit or units, or a non-volatile memory unit or units. An expansion memory 474 may also be provided and connected to the mobile computing device 450 through an expansion interface 472, which may include, for example, a SIMM (Single In Line Memory Module) card interface. The expansion memory 474 may provide extra storage space for the mobile computing device 450, or may also store applications or other information for the mobile computing device 450. Specifically, the expansion memory 474 may include instructions to carry out or supplement the processes described above, and may include secure information also. Thus, for example, the expansion memory 474 may be provided as a security module for the mobile computing device 450, and may be programmed with instructions that permit secure use of the mobile computing device 450. In addition, secure applications may be provided via the SIMM cards, along with additional information, such as placing identifying information on the SIMM card in a non-hackable manner.

The memory may include, for example, flash memory and/or NVRAM memory (non-volatile random access memory), as discussed below. In some implementations, instructions are stored in an information carrier. The instructions, when executed by one or more processing devices (for example, processor 452), perform one or more methods, such as those described above. The instructions can also be stored by one or more storage devices, such as one or more computer- or machine-readable mediums (for example, the memory 464, the expansion memory 474, or memory on the processor 452). In some implementations, the instructions can be received in a propagated signal, for example, over the transceiver 468 or the external interface 462.

The mobile computing device 450 may communicate wirelessly through the communication interface 466, which may include digital signal processing circuitry where necessary. The communication interface 466 may provide for communications under various modes or protocols, such as GSM voice calls (Global System for Mobile communications), SMS (Short Message Service), EMS (Enhanced Messaging Service), or MMS messaging (Multimedia Messaging Service), CDMA (code division multiple access), TDMA (time division multiple access), PDC (Personal Digital Cellular), WCDMA (Wideband Code Division Multiple Access), CDMA2000, or GPRS (General Packet Radio Service), among others. Such communication may occur, for example, through the transceiver 468 using a radio-frequency. In addition, short-range communication may occur, such as using a Bluetooth, WiFi, or other such transceiver. In addition, a GPS (Global Positioning System) receiver module 470 may provide additional navigation- and location-related wireless data to the mobile computing device 450, which may be used as appropriate by applications running on the mobile computing device 450.

The mobile computing device 450 may also communicate audibly using an audio codec 460, which may receive spoken information from a user and convert it to usable digital information. The audio codec 460 may likewise generate audible sound for a user, such as through a speaker, e.g., in a handset of the mobile computing device 450. Such sound may include sound from voice telephone calls, may include recorded sound (e.g., voice messages, music files, etc.) and may also include sound generated by applications operating on the mobile computing device 450.

The mobile computing device 450 may be implemented in a number of different forms, as shown in the figure. For example, it may be implemented as a cellular telephone 480. It may also be implemented as part of a smart-phone 482, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms machine-readable medium and computer-readable medium refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term machine-readable signal refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network (LAN), a wide area network (WAN), and the Internet.

The computing system can include clients and servers. A client and server are generally remote from each other and typically interact through a communication network. The relationship of client and server arises by virtue of computer programs running on the respective computers and having a client-server relationship to each other.

Although a few implementations have been described in detail above, other modifications are possible. For example, while a client application is described as accessing the delegate(s), in other implementations the delegate(s) may be employed by other applications implemented by one or more processors, such as an application executing on one or more servers. In addition, the logic flows depicted in the figures do not require the particular order shown, or sequential order, to achieve desirable results. In addition, other actions may be provided, or actions may be eliminated, from the described flows, and other components may be added to, or removed from, the described systems. Accordingly, other implementations are within the scope of the following claims.

What is claimed is:

1. A system comprising:
   a front end server that is configured to receive a given phrase that is input through a user interface by a digital component provider;
   a knowledge graph traverser that is configured to determine an entity that is being referred to by the given phrase, wherein the knowledge graph traverser performs the determination by accessing a knowledge graph comprising nodes that each uniquely identify different entities, and identifying a particular node that uniquely identifies the entity being referred to by the given phrase, wherein the nodes of the knowledge graph are connected by edges that represent relationships between connected nodes; and
   a property selector that interacts with the graph traverser and is configured to:
      identify properties of the entity by accessing other nodes that are connected to the particular node that identifies the entity;
      access a search query history that includes previous search queries provided by users;
      determine, from among the properties that were identified for the entity, one or more properties that occur in the previous search queries provided by the users at a greater frequency than other properties that were identified for the entity; and
      based on characteristics of the digital component provider, select, from among the one or more properties that occur in the previous search queries provided by the users at the greater frequency than the other properties that were identified for the entity, a subset of the properties that were identified for the entity,
wherein the knowledge graph traverser is further configured to identify additional phrases by accessing the knowledge graph using the subset of properties that were identified for the entity, and
wherein the front-end server updates the user interface to present at least some of the additional phrases with programmatic controls that assign one or more of the additional phrase as distribution criteria for digital components of the digital component provider in response to activation of the programmatic controls.

2. The system of claim 1, comprising:
a knowledge graph filter that is configured to reduce a number of accesses to the knowledge graph by the knowledge graph traverser when identifying the additional phrases.

3. The system of claim 1, comprising:
a phrase selector that is configured to identify, from among the additional phrases, one or more phrases that have a higher performance characteristic than other phrases among the additional phrases, wherein the phrase selector performs the identification by accessing phrase action scores for the identified additional phrases, comparing the phrase action scores to each other, identifying one or more of the phrase action scores having highest values based on the comparison, and selecting the one or more additional phrases having the phrase action scores having the highest values.

4. The system of claim 1, wherein the property selector is further configured to:
select the subset of the properties associated with the entity using a selection model continuously trained using machine learning.

5. The system of claim 4, wherein the property selector is further configured to:
initially train the selection model using selection model training data comprising phrases associated with the previous search queries submitted by users, digital component selection data associated with the previous search queries, entities associated with the phrases, and properties associated with the entities.

6. The system of claim 1, wherein additional phrases identified by the knowledge graph traverser comprise a minimum spanning tree among the entity.

7. A computer-implemented method comprising:
receiving a given phrase that is input through a user interface by a digital component provider;
determining an entity that is being referred to by the given phrase by accessing a knowledge graph comprising nodes that each uniquely identify different entities, and identifying a particular node that uniquely identifies the entity being referred to by the given phrase, wherein the nodes of the knowledge graph are connected by edges that represent relationships between connected nodes;
identifying properties of the entity by accessing other nodes that are connected to the particular node that identifies the entity;
accessing a search query history that includes previous search queries provided by users;
determining, from among the properties that were identified for the entity, one or more properties that occur in the previous search queries provided by the users at a greater frequency than other properties that were identified for the entity;
based on characteristics of the digital component provider, selecting, from among the one or more properties that occur in the previous search queries provided by the users at the greater frequency than the other properties that were identified for the entity, a subset of the properties that were identified for the entity;
identifying additional phrases by accessing the knowledge graph using the subset of properties that were identified for the entity; and
updating the user interface to present at least some of the additional phrases with programmatic controls that assign one or more of the additional phrase as distribution criteria for digital components of the digital component provider in response to activation of the programmatic controls.

8. The method of claim 7, comprising:
reducing a number of accesses to the knowledge graph by the knowledge graph traverser when identifying the additional phrases.

9. The method of claim 7, comprising:
identifying, from among the additional phrases, one or more phrases that have a higher performance characteristic than other phrases among the additional phrases by accessing phrase action scores for the identified additional phrases, comparing the phrase action scores to each other, identifying one or more of the phrase action scores having highest values based on the comparison, and selecting the one or more additional phrases having the phrase action scores having the highest values.

10. The method of claim 7, comprising
selecting the subset of the properties associated with the entity using a selection model continuously trained using machine learning.

11. The method of claim 10, comprising:
initially training the selection model using selection model training data comprising phrases associated with the previous search queries submitted by users, digital component selection data associated with the previous search queries, entities associated with the phrases, and properties associated with the entities.

12. The method of claim 7, wherein additional identified phrases comprise a minimum spanning tree among the entity.

13. A non-transitory computer-readable medium storing software comprising instructions executable by one or more computers which, upon such execution, cause the one or more computers to perform operations comprising:
receiving a given phrase that is input through a user interface by a digital component provider;
determining an entity that is being referred to by the given phrase by accessing a knowledge graph comprising nodes that each uniquely identify different entities, and identifying a particular node that uniquely identifies the entity being referred to by the given phrase, wherein the nodes of the knowledge graph are connected by edges that represent relationships between connected nodes;
identifying properties of the entity by accessing other nodes that are connected to the particular node that identifies the entity;
accessing a search query history that includes previous search queries provided by users;
determining, from among the properties that were identified for the entity, one or more properties that occur in the previous search queries provided by the users at a greater frequency than other properties that were identified for the entity;
based on characteristics of the digital component provider, selecting, from among the one or more properties that occur in the previous search queries provided by the users at the greater frequency than the other properties that were identified for the entity, a subset of the properties that were identified for the entity;

identifying additional phrases by accessing the knowledge graph using the subset of properties that were identified for the entity; and updating the user interface to present at least some of the additional phrases with programmatic controls that assign one or more of the additional phrase as distribution criteria for digital components of the digital component provider in response to activation of the programmatic controls.

14. The medium of claim 13, wherein the operations further comprise:

reducing a number of accesses to the knowledge graph by the knowledge graph traverser when identifying the additional phrases.

15. The medium of claim 13, wherein the operations further comprise:

identifying, from among the additional phrases, one or more phrases that have a higher performance characteristic than other phrases among the additional phrases by accessing phrase action scores for the identified additional phrases, comparing the phrase action scores to each other, identifying one or more of the phrase action scores having highest values based on the comparison, and selecting the one or more additional phrases having the phrase action scores having the highest values.

16. The medium of claim 13, wherein the operations further comprise:

selecting the subset of the properties associated with the entity using a selection model continuously trained using machine learning.

17. The medium of claim 16, wherein the operations further comprise:

initially training the selection model using selection model training data comprising phrases associated with the previous search queries submitted by users, digital component selection data associated with the previous search queries, entities associated with the phrases, and properties associated with the entities.

18. The medium of claim 13, wherein additional identified phrases comprise a minimum spanning tree among the entity.

* * * * *